US008575055B2

(12) United States Patent
Nemeth et al.

(10) Patent No.: US 8,575,055 B2
(45) Date of Patent: Nov. 5, 2013

(54) SURFACE-MODIFIED ZEOLITES AND METHODS FOR PREPARING THE SAME

(75) Inventors: Laszlo Nemeth, North Barrington, IL (US); Feng Xu, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 503 days.

(21) Appl. No.: 12/750,250

(22) Filed: Mar. 30, 2010

(65) Prior Publication Data
US 2011/0245067 A1    Oct. 6, 2011

(51) Int. Cl.
*B01J 29/06* (2006.01)

(52) U.S. Cl.
USPC ............ 502/85; 502/60; 502/62; 502/63; 502/64; 502/69; 502/77

(58) Field of Classification Search
USPC ................. 502/60, 62, 63, 64, 69, 77, 85
See application file for complete search history.

(56) References Cited

U.S. PATENT DOCUMENTS

| | | | |
|---|---|---|---|
| 4,127,616 A * | 11/1978 | Rodewald | 585/467 |
| 4,159,282 A | 6/1979 | Olson et al. | |
| 4,409,413 A | 10/1983 | Iwayama et al. | |
| 4,451,572 A | 5/1984 | Cody | |
| 4,467,129 A | 8/1984 | Iwayama et al. | |
| 4,477,583 A * | 10/1984 | Rodewald | 502/71 |
| 4,762,957 A | 8/1988 | Sachtler et al. | |
| 4,874,731 A | 10/1989 | Sachtler et al. | |
| 4,948,769 A * | 8/1990 | Chapple | 502/68 |
| 5,004,855 A | 4/1991 | Tada et al. | |
| 5,365,004 A | 11/1994 | Beck et al. | |
| 5,367,099 A | 11/1994 | Beck et al. | |
| 5,476,823 A * | 12/1995 | Beck et al. | 502/60 |
| 5,552,357 A * | 9/1996 | Lago et al. | 502/63 |
| 5,569,805 A | 10/1996 | Beck et al. | |
| 5,574,199 A | 11/1996 | Beck et al. | |
| 5,610,112 A | 3/1997 | Lago et al. | |
| 5,612,270 A | 3/1997 | Beck et al. | |
| 5,625,103 A | 4/1997 | Abichandani et al. | |
| 5,659,098 A | 8/1997 | Beck et al. | |
| 5,675,047 A | 10/1997 | Beck et al. | |
| 5,689,025 A | 11/1997 | Abichandani et al. | |
| 5,698,756 A | 12/1997 | Beck et al. | |
| 5,705,726 A | 1/1998 | Abichandani et al. | |
| 5,726,114 A * | 3/1998 | Chang et al. | 502/64 |
| 5,977,420 A | 11/1999 | Abichandani et al. | |
| 5,998,688 A | 12/1999 | Abichandani et al. | |
| 6,063,977 A | 5/2000 | Gajda et al. | |
| 6,114,592 A | 9/2000 | Gajda et al. | |
| 6,180,550 B1 | 1/2001 | Beck et al. | |
| 6,191,331 B1 | 2/2001 | Boldingh | |
| 6,359,185 B1 | 3/2002 | Boldingh et al. | |
| 6,429,347 B1 | 8/2002 | Boldingh et al. | |
| 6,504,075 B2 | 1/2003 | Beck et al. | |
| 6,541,408 B2 * | 4/2003 | Chang et al. | 502/64 |
| 6,613,708 B1 * | 9/2003 | Ou et al. | 502/64 |
| 6,864,200 B2 * | 3/2005 | Das et al. | 502/63 |
| 6,878,657 B2 | 4/2005 | Jasra et al. | |
| 7,230,152 B1 | 6/2007 | Boldingh | |
| 7,238,636 B2 | 7/2007 | Beck et al. | |
| 7,247,762 B2 | 7/2007 | Stern | |
| 7,375,047 B1 | 5/2008 | Larson et al. | |
| 7,381,677 B1 | 6/2008 | Bogdan et al. | |
| 7,387,978 B2 | 6/2008 | Wu et al. | |
| 2005/0020435 A1 | 1/2005 | Beck et al. | |
| 2007/0004948 A1 | 1/2007 | Bauer | |
| 2007/0060778 A1 | 3/2007 | Bogdan et al. | |
| 2007/0249881 A1 | 10/2007 | Larson et al. | |
| 2007/0259780 A1 | 11/2007 | Bogdan et al. | |
| 2007/0270624 A1 | 11/2007 | Bogdan et al. | |
| 2007/0299289 A1 | 12/2007 | Bresler et al. | |

FOREIGN PATENT DOCUMENTS

| | | |
|---|---|---|
| CA | 2317325 | 3/2002 |
| EP | 1138659 | 10/2001 |
| EP | 1679286 A1 | 7/2006 |
| EP | 2014619 A2 | 1/2009 |
| JP | 03181425 | 7/1991 |
| WO | 9427934 | 12/1994 |
| WO | 9531421 | 11/1995 |
| WO | 9723435 | 7/1997 |
| WO | 0037398 | 6/2000 |
| WO | 2008136829 | 11/2008 |
| WO | 2009075957 | 6/2009 |

OTHER PUBLICATIONS

Machine translation of JP 2004066126, Mar. 4, 2004.*
Zhu, Z., et al., Shape-selective disproportionation of ethylbenzene to para-diethylbenzene over ZSM-5 modified by chemical liquid deposition and MgO, Journal of Molecular Catalysis A: Chemical, v 248, n 1-2, p. 152-158, Apr. 3, 2006.
Zhu, Z., et al., Chemical liquid deposition with polysiloxane of ZSM-5 and its effect on acidity and catalytic properties, Microporous and Mesoporous Materials, v 101, n. 1-2 SPEC. ISS., p. 169-175, Apr. 19, 2007.
Chen, W. et al., Effects of surface modification on coking, deactivation and para-selectivity of H-ZSM-5 zeolites during ethylbenzene disproportionation, Journal of Molecular Catalysis A: Chemical, v 181, n 1-2, p. 41-55, Mar. 25, 2002.

(Continued)

*Primary Examiner* — Elizabeth Wood
(74) *Attorney, Agent, or Firm* — Mark Goldberg

(57) ABSTRACT

Surface-modified zeolites and methods for preparing surface-modified zeolites are provided. A hybrid polymer formed from a silicon alkoxide and a metal alkoxide, a co-monomer, or both, is contacted with a zeolite suspension. The zeolite suspension comprises a sodium-, an ammonium-, or a hydrogen-form zeolite and a solvent. The hybrid polymer and zeolite suspension are contacted under conditions sufficient to deposit hybrid polymer on external surfaces of the zeolite to form a treated zeolite. Solvent is removed therefrom. The treated zeolite is dried and calcinated to form a dried and calcinated treated zeolite. Forming of the zeolite suspension and the contacting, removing, drying, and calcinating steps are provided in one selectivation sequence to produce a surface-modified zeolite from the ammonium-form zeolite and the hydrogen-form zeolite. If the dried and calcinated treated zeolite is a sodium-form zeolite, the sodium is exchanged with ammonium and then additionally dried and calcinated.

1 Claim, 1 Drawing Sheet

(56) References Cited

OTHER PUBLICATIONS

Roger, H.P, et al., Effects of in-situ chemical vapour deposition using tetraethoxysilane on the catalytic and sorption properties of ZSM-5, Microporous and Mesoporous Materials, v 21, n 4-6, p. 607-614, May 1998.

Das, Jagannath, Ethylbenzene dealkylation and realkylation over pore size regulated MFI zeolite, Industrial and Engineering Chemistry Research, v 32, n 11, p. 2525-2529, Nov. 1993.

Das, Jagannath, Selective toluene disproportionation over pore size controlled MFI zeolite, Industrial and Engineering Chemistry Research, v 33, n 2, p. 246-250, Feb. 1994.

Haleri, A., et al., Recent advances in selectivation of zeolites for para-disubstituted aromatics, Catalysis Today, v 73, n 1-2, p. 65-73, Apr. 1, 2002.

Ren, X., et al., H-MCM-22 zeolitic catalysts modified by chemical liquid deposition for shape-selective disproportionation of toluene, Journal of Porous Materials, v 13, n 3, p. 353-357, Aug. 2006, et al.

Slinkin, A A et al; Texture, electron-acceptor, acid-base, and catalytic properties of modified ZSM-5 type zeolites—4. Catalytic activity in the reaction[s] of ethylbenzene [and toluene] disproportionation, Kinetika i Kataliz (ISSN 0453-8811) V36 N.4 575-80 (Jul.-Aug. 1995) Institute of Organic Chemistry; Russian Academy of Sciences Language: Russian.

Hongchen, G., et., Modified nano-HZSM-5 zeolite as para-selective alkylation catalyst, Chinese Journal of Catalysis 21(5) 2000 p. 397-398e.

Uguina, M A, et al., Kinetics of toluene disproportionation over unmodified and modified ZSM-5 zeolites, Industrial & Engineering Chemistry Research (ISSN 0888-5885) V32 N.1 49-55 (Jan. 1993) American Chemical Society (ACS.

Niwa M, Fine control of pore size of H-mordenite by vapor-phase deposition of SI(OCH3)4 ((Methylorthosilicate) (MOS)), 8th Int. Congr. Catal (West Berlin Jul. 2-4, 1984) Proc. V4 701-11 (1984).

Bauer, F., et al. "Selectivity Improvement in Xylene Isomerization." Stud. Surf. Sci. Catal. 154C, no. Recent Advances in the Science and Technology of Zeolites and Related Materials (2004): 2169-78.

Bauer, F., et al. "Improvement of Coke-Induced Selectivation of H-ZSM-5 During Xylene Isomerization." Microporous Mesoporous Mater. 47, No. 1 (2001): 67-77.

Bauer, F., et al. "Use of Coke-Selective H-ZSM-5 in Xylene Isomerization." Stud. Surf. Sci. Catal. 135, no. Zeolites and Mesoporous Materials at the Dawn of the 21st Century (2001): 4533-40.

Bauer, F., et al. "C-14 Studies in Xylene Isomerization on Modified HZSM-5." Appl. Catal., A 289, No. 1 (2005): 2-9.

Cejka, J., et al., "Decisive Role of Transport Rate of Products for Zeolite Para-Selectivity: Effect of Coke Deposition and External Surface Silylation on Activity and Selectivity of HZSM-5 in Alkylation of Toluene." Zeolites 17, No. 3 (1996): 265-71.

Chen, W. et al. "Acidity Characterization of H-ZSM-5 Catalysts Modified by Pre-Cooking and Silylation." Stud. Surf. Sci. Catal. 154C, no. Recent Advances in the Science and Technology of Zeolites and Related Materials (2004): 2269-74.

Vu, D. et al., Catalytic activities and structures of silicalite—1/H-ZSM-5 zeolite composites, ScienceDirect, Microporous and Mesoporous Materials, 2008.

Csicery, S. "Shape-Selective Catalysis in Zeolites." Prepr. Pap.—Am. Chem. Soc., Div. Fuel Chem. 28, No. 2 (1983): 116-26.

Zheng, S.,et al., On the enhanced selectivity of HZSM-5 modified by chemical liquid deposition, Topics in Catalysis, vol. 22, No. 1/2, Jan. 2003.

Csicery, S., "The Future of Shape Selective Catalysis." Stud. Surf. Sci. Catal. 94, no. Catalysis by Microporous Materials (1995): 1-12.

Berger, C., et al., "Hydroconversion of Methylcyclohexane on TEOS Modified H-ZSM-5 Zeolite Catalyst." Micrporous and Mesoporous Materials 59 (2003): 1-12.

Zheng, et al., "Xylene Isomerization in Situ IR Study." Journal of Catalysis 241 (2006): 304-11.

Manstein, H., et al. "Cyclic Chemical Vapor Deposition of TEOS on ZSM-5: Effect of Deposition Temperature on Shape Selective Performance." Stud. Surf. Sci. Catal. 135, no. Zeolites and Mesoporous Materials at the Dawn of the 21st Century (2001): 1586-93.

Manstein, H., et al. "Effect of the Deposition Temperature on the Chemical Vapour Deposition of Tetraethoxysilane on ZSM-5." Microporous Mesoporous Mater. 51, No. 1 (2002): 35-42.

Tominaga., et al . "HZSM-5 Modified by Silica CVD for Shape Selective Production of P-Xylene ." Microporous and Mesoporous Materials 117 (2009): 523-29.

Roger, H. P., et al., "Effects of in-Situ Chemical Vapor Deposition Using Tetraethoxysilane on the Catalytic and Sorption Properties of ZSM-5." Microporous Mesoporous Mater. 21, No. 4-6 (1998): 607-14.

Weber, R. W., et al., "The Characterization and Elimination of the External Acidity of ZSM-5." Microporous Mater. 7, No. 1 (1996): 15-25.

Weber, R. W., et al., "The Chemical Vapor and Liquid Deposition of Tetraethoxysilane on ZSM-5, Mordenite and Beta." Microporous Mesoporous Mater. 35-36 (2000): 533-43.

Weber, R. W., et al., "The Chemical Vapor and Liquid Deposition of Tetraethoxysilane on the External Surface of ZSM-5." Microporous Mesoporous Mater. 23, No. 3-4 (1998): 179-87.

Weber, R. W., et al., "Effect of Different Silanization Procedures on the External Surface Activity and Shape Selectivity of HZSM-5." Proc. Int. Zeolite Conf., 12th, 2015-221999.

Zheng, S., et al., "Structural Properties and Sieving Effects of Surface Modified ZSM-5." Stud. Surf. Sci. Catal. 135, no. Zeolites and Mesoporous Materials at the Dawn of the 21st Century (2001): 1772-79.

Al-Khattaf, S., et al,Modeling Xylene Reaction over ZSM-5 in a Riser Simulator: 1,3 versus 1,2 Methyl Shift, Ind. Eng. Chem. Res. 2005, 44, 7957.

Bhat, Y., et al., Effect of extrusion and silylation of ZSM-5 on para-selectivity of diethylbenzenes, Applied Catalysis A; General, 122, 1995, 161-168.

Moreau, F., et al., Ethlybenzene transformation on bifunctional Pt/Al2O3-NaHMOR catalysts Influence of Na exchange on their activity and selectivity in ethylbenzene isomerization, Appled Catalysis, A: Gen. 2002, 230, 253.

Rao, B., et al., Enhanced para Selectivity in Alkylation and Isomerization Reactions over Silynated Zsm-5 Zeolite, ACS Symposium Series (2000), 738 225-235.

Kim, E., et al., Low Pressure Chemical Vapor Deposition of Silicon Dioxide Films by Thermal Decomposition of Tetra-alkoxysilanes, J. Electrochem Soc., vol. 142 No. 2, Feb. 1995.

Serra, J.M., et al, A rational design of alky-aromatics dealkylation-transalkylation catalysts using C8 and C9 alkyl-aromatics as reactants, J. Catal. 2004, 227, 459.

Mohr, G., et al., ExxonMobil State-of-the-Art Xylenes Isomerization Technology, Pre-Print Archive—American Institute of Chemical Engineers, [Spring National Meeting], New Orleans, LA, United States, 2002.

Ebner, T., et al., UOP's New Xylene Isomerization Catalysts (I-300TM series), Pre-Print Archive—American Institute of Chemical Engineers, [Spring National Meeting], New Orleans, LA, United States, 2002.

NG, L., et al., Acidic Sol-Gel Polymerization of TEOS: Effect of Solution Composition on Cyclization and Bimolecular Condensation Rate, J Phys Chem, 100 No. 30 (1996) 12517-31.

Vainrub, A. F. et al., Sol-Gel Polymerization in Alkoxysilances: 29si NMR Study and Simulation of Chemical Kinetics, Mater Sci. Eng. BB37, No. 1-3 (1996) 197-200.

Mukkamala, R, et al., Acid and Base Effects on the Morphology of Composites Formed From Microemulsion Polymerization and Sol-Gel Processing, J. Mater Sci 32, No. 17, 1997, 4687-92.

Mukkamala, R, et al.,Polymer Composites Obtained by Polymerization of Microemulsions Formed with Inorganic and Organic Monomers, Langmuir 13, No. 4, 1997, 612-22.

Chudasama, C., et al., Pore-Size Engineering of Zeolite A for the Size/Shape Selective Molecular Separation, Ind. Eng. Chem. Res., 2005, 44, 1780-1786.

Camblor, M.A., et al., Characterization of nanocrystalline zeolite Beta, Microporous and Mesoporous Materials, 25, 1998, 59-74.

(56) References Cited

OTHER PUBLICATIONS

Roger, H.P., et al., Fundamental Relations between Modification of the External Surface of Zeolites and Catalytic Performance, DGMK-Conference The Future of Aromatics in Refining and Petrochemistry.: Erlangen 1999.

Cejka, J., et al., Acid-Catalyzed Synthesis of Mono-and Dialkyl Benzense Over Zeolites: Active Sites, Zeolite Topology, and Reaction Mechanisms, Catalysis Review, 44 (3) 2002, 375-421.

Zilkova, N., et al., The role of the zeolite channel architecture and acidity on the activity and selectivity in aromatic transformations: The effect of zeolite cages in SSZ-35 zeolites, Journal of Catalysis 266, 2009, 79-91.

Nakajima, T., et al., A CVD Mechanism of SiO2 from TEOS, Surface Modification Technologies VII, The Institute of Materials, 1994.

Adachi, M., et al., Nanoparticle formation mechanism in CVD reactor with ionization of source vapor, Journal of Nanoparticle Research 5:31-37, 2003.

Labun, A., et al., Mechanistic feature-scale profile simulation of SiO2 pressure chemical vapor deposition by tetraethoxysilane pyrolysis, J. Vac. Sci. Technol. B. (18) 1, Jan./Feb. 2000.

Kawahara, T., et al., Reaction Mechanism of Chemical Vapor Deposition Using Tetraethylorthosilicate and Ozone at Atmospheric Pressure, Jpn. J. App. Phys, vol. 31, 1992, 2925-2930.

Romet, S., et al., Modeling of Silicon Dioxide Chemical Vapor Deposition from Tetraethoxysiliane and Ozone, Journal of Eletrochemical Society, 148 (2) 2001, G82-G90.

Bauer, F., et al., Surface modification of nano-sized HZSM-5 and HFER by pre-cooking and silanization, ScienceDirect, Journal of Catalysis, 251, 2007, 258-270.

Llopis, F., et al., Isomerization and disproportionation of m-xylene in a zeolite with 9-and 10- membered ring pores; Molecular dynamics and catalytic studies, ScienceDirect, Journal of Catalysis, 242, 2006, 195-206.

Long, Y., et al., The Affinity Order of Organics on Hydrophobic Zeolite Silicalite-1 Studied by Thermal Analysis, Progress in Zeolite and Microporous Materials, Studies in Surface Science and Catalysis, vol. 105, 1997.

Bhat, Y., et al., Inactivation of External Surface of ZSM-5; Zeolite Morphology, Crystal Size, and Catalytic Activity, Journal of Catalysis, 159, 1996, 368-374.

Fairen-Jimenez, D., et al., Adsorption of Benzene, Toluene, and Xylenes on Monolithic Carbon Aerogels from Dry Air Flows, Langmuir, 23, 1007, 10095-10101.

Xomeritakis, G., et al., Separation of Xylene Isomer Vapors with Oriented MFI Membranes Made by Seeded Growth, Ind. Eng. Chem Res. 40, 2001, 544-552.

Zheng, S., et al., Influence of Surface Modification on the Acid Site Distribution of HZSM-5, J. Phys. Chem. B, 106, 2002, 9552-9558.

Reitmeier, S., et al., Influence of Postsynthetic Surface Modification on Shape Selective Transport of Aromatic Molecules in HZSM-5, J. Phys. Chem. C. 2009.

Zheng, S., et al., Xylene isomerization with surface-modified HZSM-5 zeolite catalysts; An in situ IR study, ScienceDirect, Journal of Catalysis, 241, 2006, 304-311.

Bhanap, A., et al., A carbon-restoring silylation process for low-k dielectric repair, Solid State Technology, Jul. 2007.

O'Connor, C., et al., The effect of temperature and cyclic alkoxysilance deposition procedures on the silanisation and subsequent catalytic and sorption properties of zeolites, Journal of Molecular Catalysis A: Chemical 181, 2002, 15-24.

Wang, I, et al., Para-selectivity of Dialklbenzenes over Modified HZSM-5 by Vapour Phase Deposition of Silica, Applied Catalysis, 54, 1989, 257-266.

Sauer, J. Molecular Structure of Orthosilicic Acid Silanol, H3SIOH-AIH3 Complex: Models of Surface Hydroxyis in Silica and Zeolites, J. Phys, Chem. 91, 1987, 2315-2319.

Angelescu, E.,et al., Investigation of Phosphorus Location on P-HZSM-5 Zeolites Related to Their Shape Selectivity, Progress in Catalysis 1996, 5, 25.

* cited by examiner

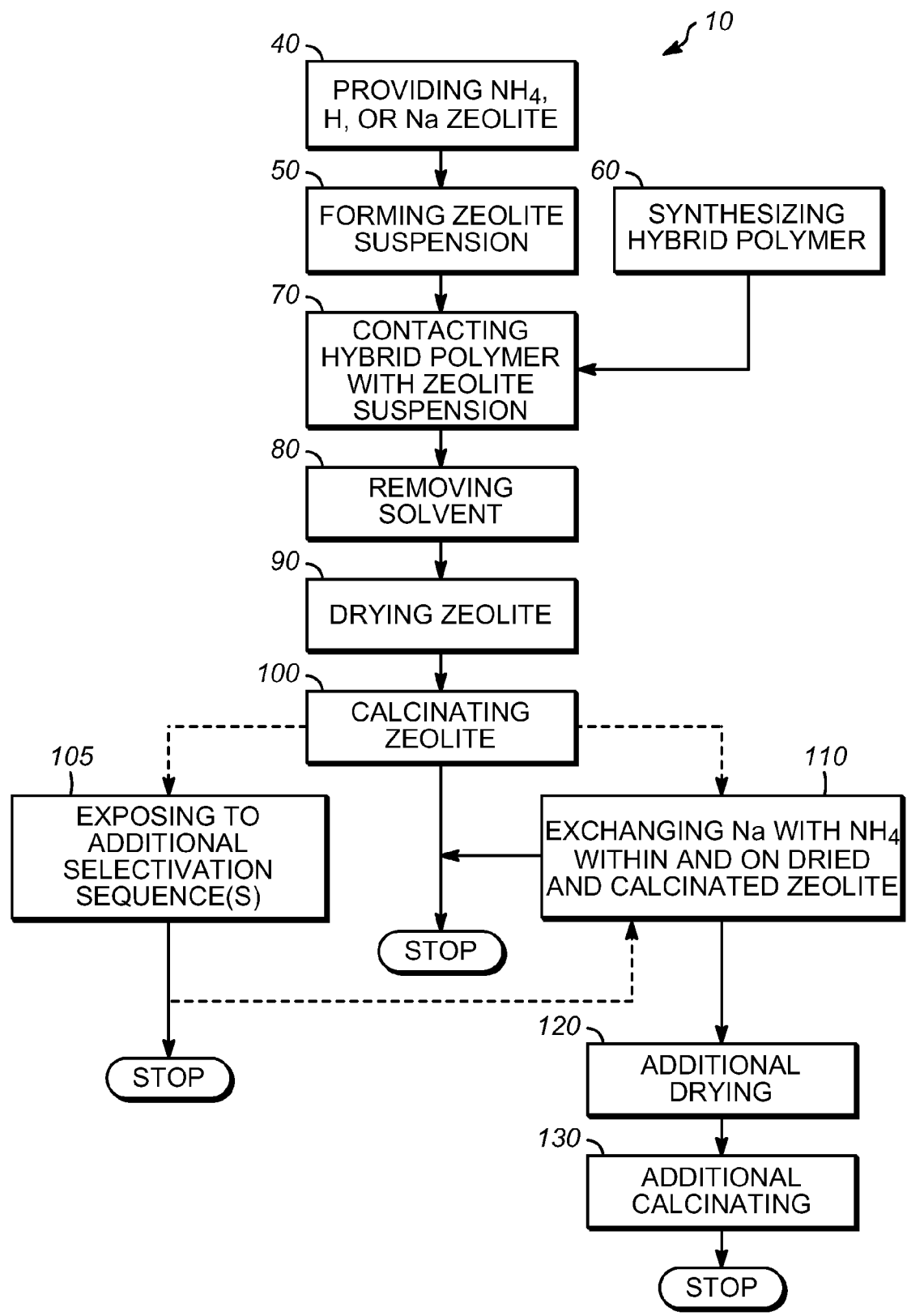

SURFACE-MODIFIED ZEOLITES AND METHODS FOR PREPARING THE SAME

FIELD OF THE INVENTION

The present invention generally relates to surface-modified zeolites and their preparation, and more particularly relates to surface-modified zeolites and to methods for the surface modification of zeolites with hybrid polymers to impart desired surface properties.

DESCRIPTION OF RELATED ART

Zeolites generally are porous oxide structures that have well-defined pore structures due to a high degree of crystallinity. Conventional zeolites include crystalline aluminosilicate zeolites. Crystalline aluminosilicate zeolites can comprise both natural and synthetic aluminosilicates. Crystalline aluminosilicate zeolites include those having aluminosilicate cage structures in which alumina and silica tetrahedra are intimately connected with each other in an open three dimensional crystalline network. The tetrahedra are cross linked by the sharing of oxygen atoms, with spaces between the tetrahedra occupied by water molecules prior to partial or total dehydration of the zeolite. Dehydration results in crystals interlaced with channels having molecular dimensions. In a hydrated form, the crystalline aluminosilicate zeolites are generally represented by the formula, $M_{2/n}O:Al_2O_3:wSiO_2:yH_2O$, where "M" is a cation that balances the electrovalence of the tetrahedra and is generally referred to as an exchangeable cationic site, "n" represents the valence of the cation, "w" represents the moles of $SiO_2$, and "y" represents the moles of water. The exact structure type aluminosilicate zeolite is generally identified by the particular silica:alumina molar ratio ($SiO_2/Al_2O_3$) and the pore dimensions of the cage structures. Cations (M) occupying exchangeable cationic sites in the zeolite may be replaced with other cations by ion exchange methods well known to those having ordinary skill in the field of crystalline aluminosilicates.

Zeolite crystalline particles may be formed from zeolite fine powder mixed with a binder. The binder may be an amorphous inorganic material, such as silica, alumina or certain clays and mixtures thereof "Formed zeolites" may be extrudates, tablets, oil drops, microspheres, spheres, such as beads, or the like. The zeolites may be formed by oil-dropping, spray-drying, extrusion, or other "forming" techniques.

Zeolites are commonly used as an active component in various catalytic applications. Zeolites may also be used for adsorption and separation processes. It has been recognized that the surface properties of certain zeolites can be modified to enhance their molecular-sieving or shape-selective capability. Such modification treatments are called zeolite selectivation. Selectivated zeolites (referred to herein as "surface-modified zeolites") can more accurately differentiate molecules on the basis of molecular dimension or steric characteristics than unselectivated zeolites. Zeolite selectivation can be accomplished using many techniques. Reports of using compounds of silicon, phosphorous, boron, antimony, coke, magnesium, etc. for selectivation have been documented. However, zeolite selectivation using such compounds has not sufficiently resulted in zeolites having passivated active sites for a decreased surface acidity, and zeolitic pores that can accurately differentiate molecules to facilitate catalysis applications and adsorptive processes of interest, such as para-alkyl selectivation. As used herein, the term "para-alkyl selectivation" refers to modifying a catalyst or catalytic reaction system so that it preferentially forms more para-substituted dialkylbenzenes than the expected equilibrium proportions relative to the other isomers.

Accordingly, it is desirable to provide surface-modified zeolites and methods for preparing the same. In addition, it is desirable to provide surface-modified zeolites that have such desired surface properties as a decreased surface acidity and pore size, and increased surface silica to alumina molar ratio, which properties are useful in certain catalytic applications and adsorptive processes, such as para-alkyl selectivation. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Selectivation methods are provided for preparing a surface-modified zeolite. In accordance with one exemplary embodiment, a method for preparing a surface-modified zeolite comprises contacting a hybrid polymer, formed from a silicon alkoxide and a metal alkoxide, a co-monomer, or both, with a zeolite suspension. The zeolite suspension comprises a zeolite and a solvent. The zeolite is comprised of an ammonium-form zeolite, a hydrogen-form zeolite or a sodium-form zeolite. The hybrid polymer and zeolite suspension are contacted under conditions sufficient to deposit the hybrid polymer on external surfaces of the zeolite to form a treated zeolite. The solvent is removed from the treated zeolite. The treated zeolite is dried and calcinated to form a dried and calcinated treated zeolite. The forming of the zeolite suspension and the contacting, removing, drying and calcinating steps comprise a selectivation sequence producing a surface-modified zeolite from the ammonium-form zeolite and the hydrogen-form zeolite. If the dried and calcinated treated zeolite is a sodium-form zeolite, the method further comprises exchanging the sodium with ammonium at ion-exchangeable sites of the dried and calcinated treated zeolite. After the exchanging step, the dried and calcinated treated zeolite is additionally dried and calcinated.

Methods are provided for modifying the surface of a zeolite in accordance with yet another exemplary embodiment of the present invention. The method comprises contacting a zeolite suspension comprised of a zeolite and a solvent with a hybrid polymer in a liquid phase to deposit the hybrid polymer on external surfaces of the zeolite. The liquid phase is then removed. The zeolite having the hybrid polymer deposited on external surfaces thereof is dried and calcinated. During the calcinating step, the hybrid polymer oxidizes to one or more metal oxides on the external surfaces of the zeolite to form a surface-modified zeolite.

Surface-modified zeolites having metal oxide-enriched external surfaces produced by the methods are also provided in accordance with another exemplary embodiment of the present invention. The surface-modified zeolites comprise a selectivated zeolite having external surfaces. A coating on the external surfaces comprises a metal oxide. The metal oxide is $SiO_2$, $SiO_2$ and $TiO_2$, $SiO_2$ and $ZrO_2$, and $SiO_2$, $TiO_2$, and $ZrO_2$.

BRIEF DESCRIPTION OF THE DRAWINGS

The present invention will hereinafter be described in conjunction with the following drawing FIGURE, wherein like numerals denote like elements, and wherein:

FIG. 1 is a flow chart of a method for preparing a surface-modified zeolite according to exemplary embodiments of the present invention.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The various embodiments of the present invention are directed to a surface-modified zeolite having metal oxide-enriched external surfaces and selectivation methods for preparing such a surface-modified zeolite. The surface-modified zeolite comprises a hydrogen-form zeolite having external surfaces upon which is deposited a dried and calcinated hybrid polymer having repeating ($-Si-O-Si-O-X-O-Si-$)$_n$ linkages, wherein X=silicon, titanium, zirconium, an organic linker, or a combination thereof and n=number of repeating units. The silicon, titanium, and zirconium each have a valence of four. The organic linker is a co-polymer as hereinafter described. The dried and calcinated hybrid polymer is formed from in-situ polymerization of a silicon alkoxide and a metal alkoxide, a co-monomer, or both. As used herein, the "metal alkoxide" is other than a silicon alkoxide. The surface-modified zeolite may comprise a formed zeolite, as hereinafter described. The surface-modified zeolite may be referred to synonymously herein as a "selectivated zeolite."

FIG. 1 is a flow diagram of a selectivation method 10 for preparing a surface-modified zeolite in accordance with an exemplary embodiment. The selectivation method 10 begins by providing an ammonium ($NH_4$)-form zeolite, a hydrogen-form zeolite, or a sodium (Na)-form zeolite (step 40). The ammonium-, hydrogen-, or sodium-form zeolite may be a zeolite powder or a "formed zeolite", as hereinafter described.

According to exemplary embodiments of the present invention, the ammonium-form, the hydrogen-form, or the sodium-form zeolite comprises a crystalline aluminosilicate zeolite having a porous oxide structure with a well-defined pore structure due to the high degree of crystallinity. Suitable exemplary zeolites for the ammonium-, hydrogen-, and sodium-form zeolites include those having structure type MFI (e.g., ZSM-5; U.S. Pat. No. 3,702,886), MEL (e.g., ZSM-11; U.S. Pat. No. 3,709,979), MTW (e.g., ZSM-12; U.S. Pat. No. 3,832,449), TON (e.g., ZSM-22), MTT (e.g., ZSM-23; U.S. Pat. No. 4,076,842), FER (e.g., ZSM-35; U.S. Pat. No. 4,016,245), EUO (e.g., ZSM-50), FAU (e.g., Zeolites X; U.S. Pat. No. 2,882,244 and Y; U.S. Pat. No. 3,130,007), EMT, IMF, TUN, MEI, MSE, and BEA (Beta). Additionally, suitable exemplary zeolites include UZM zeolites available from UOP LLC (Des Plaines, Ill. (USA)) and covered under one or more of the following U.S. patents or published applications: U.S. Pat. Nos. 6,419,895, 6,613,302, 6,776,975, 6,713,041, 6,756,030, 7,344,694, 6,752,980, 6,982,074, 6,890,511, 7,575,737, US 2008-0170987, and US 2008-0031810. A preferred zeolite comprises a MFI zeolite available from UOP, LLC. Zeolite structure types are described in "*Atlas of Zeolite Structure Types*", W. M. Meier, D. H. Olson and C. Baerlocher, 5th revised edition, 2001, Elsevier. The zeolites have ion exchangeable sites within and on the surface of the zeolite. Sodium occupies ion exchangeable sites within and on the surface of the "sodium-form zeolite", ammonium ($NH_4$) occupies ion exchangeable sites within and on the surface of the "ammonium-form zeolite" (or "$NH_4$-zeolite"), and hydrogen occupies the ion exchangeable sites within and on the surface of the "hydrogen-form zeolite", each in the range of about 0.1% to about 10% by weight of the zeolite.

In one embodiment, the ammonium-, hydrogen-, or sodium-form zeolite (as powder or as a "formed zeolite") may be commercially available and thus obtained by commercial sources. Alternatively, the sodium-ammonium-, or hydrogen-form zeolite may be synthesized according to known methods, such as by crystallizing a silica-alumina gel composition formed from an alumina source such as sodium aluminate, Boehmite, aluminum alkoxides such as aluminium-isopropyloxide, aluminum sec-butoxide, aluminum trihydroxide, or the like and a silica source such as sodium silicate, alkyl silicates such as tetraethyl orthosilicate and the like and silica sources known under the trade marks and names Ludox®, Ultrasil®, Hysil, or the like. Other aluminosilicates such as kaolin are used as well. The alumina and silica may be dissolved with a template as known in the art in a basic environment, such as, for example, a sodium hydroxide aqueous solution, and crystallized at about 70° C. to about 300° C., preferably at about 75° C. to about 200° C., and most preferably about 100° C. After crystallization, the zeolite is in a sodium form. Zeolite synthesis using a template to direct the formation of specific zeolite topologic framework structures is known to those skilled in the art. Some common structure directing agents (templates) include organo ammonium cations selected from quaternary ammonium cations, protonated amines, diquaternary ammonium, etc. The use of structure directing agents, however, is optional in synthesis of some zeolites (e.g., MFI, zeolite X).

The sodium form of the zeolite may optionally be ion exchanged with ammonium to form a "$NH_4$-form zeolite". In this regard, the sodium-form zeolite is exposed to an ammonium-comprising solution, such as, for example, a $NH_4NO_3$ solution, for ion-exchange to produce the $NH_4$-form zeolite. In a preferred embodiment, substantially all of the ion-exchangeable Na sites of the zeolite are exchanged with $NH_4$ such that the weight percent of Na in the $NH_4$-form of the zeolite preferably is less than about 0.5% (on a volatile free basis).

Once formed, the sodium- or $NH_4$-form zeolite is then dried by known drying methods. For example, the sodium- or $NH_4$-form zeolite may be dried overnight, such as in flowing nitrogen at 200° C. and cooled down in dry nitrogen to 50° C. Alternatively, the sodium or $NH_4$-form zeolite may be calcinated. Calcination of the $NH_4$-form zeolite results in the hydrogen-form zeolite. Calcination may be performed at temperatures of about 400° C. to about 600° C., preferably about 550° C., under inert atmosphere and/or air using a heating rate of about 0.5° C./minute to about 10° C./minute, preferably at 2° C./minute for about one to about ten hours, preferably for about four hours.

As noted above, the ammonium-, hydrogen-, and sodium-form zeolite may be a zeolite powder or a "formed zeolite". A "formed zeolite" comprises the zeolite powder bound with an inert binder. In a preferred embodiment, the inert binder may include those well known in the art such as alumina, silica, aluminophosphate (ALPO) binder, and combinations thereof. For example, the formed zeolite may be prepared into extrudates by forming methods well known in the art. The extrudates may be comprised of from about 35 to about 90 wt % of powdered zeolite and about 10 to about 65 wt % of inert binder (on a volatile-free basis). The preferred binder concentration comprises about 12 to about 30 wt % of the surface-modified zeolite. While formed zeolites in the form of extrudates have been described, the invention is not so limited. The zeolite powder may be formed with the inert binder into beads, tablets, macrospheres, extrudates, oil drops, microspheres, and spheres such as beads or the like. Such "forming" may occur prior to or after ion-exchange, as previously described.

A zeolite suspension is then formed (step 50). To form the zeolite suspension, a solvent is added to the sodium-, ammonium-, or hydrogen-form zeolite. The solvent may be an organic solvent such as acetone, actetonitrile, tetrahydrofuran, dimethyl ether, toluene, xylene, pentanes, hexanes, heptanes, octanes, or the like, and combinations thereof or a water/alcohol mixture with an exemplary alcohol being ethanol, methanol, 2-propanol, 1-butanol, tert-butanol, or a combination thereof. The weight percent of sodium-, ammonium-, or hydrogen-form zeolite to liquid phase is about 5 to about 30%. The weight percent of water to alcohol in the water/alcohol mixture comprises about 1% to about 20%.

Next, a hybrid polymer is synthesized (step 60). As used herein, a "hybrid polymer" comprises polymeric silicon compounds (including co-polymeric silicon alkoxides with other metal alkoxides such as titanium alkoxides and zirconium alkoxides), or a mixture of polymeric and monomeric silicon compounds formed using the known sol-gel method to obtain in-situ polymerization and co-polymerization, in the presence of an acidic or basic catalyst, of the silicon alkoxide and the metal alkoxide, the co-monomer, or both. As used herein, and described previously, a "metal alkoxide" refers to a metal alkoxide other than silicon alkoxide. The hybrid polymer has repeating —Si—O—Si—O—X—O—Si— linkages, wherein X is silicon, titanium, zirconium, an organic linker such as a co-monomer, or a combination thereof. The silicon, titanium, and zirconium each have a valence of four. The term "hybrid" as used herein refers to the polymers having differing average molecular weights ranging from 208-10,000. Inorganic mineral acids such as hydrochloric, nitric, sulfuric, phosphoric, hydrofluoric, acetic, citric acid or the like may be used as the acidic catalyst Ammonium hydroxide, alkylated derivatives of ammonium hydroxide, or the like may be used as the basic catalyst.

Exemplary silicon alkoxides useful in the synthesis of the hybrid polymer comprise a tetraalkyl orthosilicate such as a tetramethyl orthosilicate (TMOS), a tetraethyl orthosilicate (TEOS), a tetrapropyl orthosilicate (TPOS), a tetrabutyl orthosilicate (TBOS), and combinations thereof. A preferred tetraalkyl orthosilicate is TEOS. Exemplary metal alkoxides include titanium alkoxides such as titanium (IV) methoxide, titanium (IV) n-butoxide, titanium (IV) t-butoxide, titanium (IV) i-propoxide, and titanium (IV) ethoxide, and combinations thereof, and zirconium alkoxides such as Zirconium (IV) n-butoxide, Zirconium (IV) t-butoxide, Zirconium (IV) ethoxide, Zirconium (IV) propoxide, and combinations thereof. The molar ratio of the metal alkoxides to the silicon alkoxides comprises about 0.01 to about 0.5, preferably about 0.1.

Exemplary co-monomers include: bisacrylamides, such as N,N'-methylene-bis-acrylamide, N,N'-ethylene-bis-acrylamide, N,N'-hexamethylene-bis-acrylamide, glyoxal-bis-acrylamide, and the like; bis-methacrylamides, such as N,N'-methylene-bis-methacrylamide, N,N'-ethylene-bis-methacrylamide, N,N'-hexamethylene-bis-methacrylamide, and the like; bis-acrylates, such as N-diethylmethacrylate, dimethylmethacrylate and the like; ethylene glycol-methacyletes and the like; and diallyltartradiamide. The co-monomers impart cross-linking properties to the hybrid polymer. The amount of the co-monomer comprises about 0.5 wt % to about 10 wt % of the hybrid polymer.

After the hybrid polymer is synthesized, the zeolite is surface modified by contacting the zeolite suspension with the hybrid polymer to deposit hybrid polymer on the zeolite to form a "treated zeolite" (step 70). The hybrid polymer is heated with the zeolite suspension (the mixture of the hybrid polymer and zeolite suspension referred to herein as a "refluxing mixture") at about room temperature (25° C.) to about the boiling point of the solvent. The temperature is maintained for an effective period of time of about one hour to about 24 hours, preferably two hours, to at least partially polymerize the refluxing mixture. The weight ratio of hybrid polymer to zeolite suspension comprises about 1 to about 100, preferably about 1 to about 10.

The treated zeolite is recovered from the refluxing mixture by removing the liquid phase by known liquid/solid separation techniques such as filtration, distillation, solvent evaporation, or the like (step 80). The separated treated zeolite is then dried (step 90). Drying may be performed at temperatures of from about 60° C. to about 200° C. The drying time ranges from about one hour to about 24 hours. After drying, the water content of the separated solids may be about 2% LOI at 900° C. to about 25% LOI, preferably about 7% LOI at 900° C. The LOI test is described in UOP Test Method No. UOP954-03 (available through ASTM International, 100 Barr Harbor Drive, PO Box C700, West Conshohocken, Pa., 19428-2959 USA).

The dried solid phase is then calcinated to form a dried and calcinated treated "selectivated" zeolite (step 100). Calcination is performed at temperatures of from about 400° C. to about 600° C., preferably about 550° C., under inert atmosphere and/or air using a heating rate of about 1° C./minute to about 10° C./minute, preferably about 2° C./minute for about 1 to about 24 hours, preferably about four hours, and then cooled. During calcination, the deposited hybrid polymer is converted (oxidized) to metal oxide such as $SiO_2$, or a mixture of metal oxides such as $SiO_2$—$TiO_2$, $SiO_2$—$ZrO_2$, or $SiO_2$—$TiO_2ZO_2$, depending on the hybrid polymer used to form a coating on the external surfaces of the selectivated zeolite. The one or more metal oxides comprise about 1% to about 20%, preferably about 2% to about 10%, of the surface-modified zeolite. The calcination step 100 also converts the ammonium, if present, at ion-exchangeable sites within and on the zeolite to hydrogen. The sequential forming of the zeolite suspension, contacting, removing, drying, and calcinating steps are referred to herein as a "selectivation sequence." The selectivation sequence produces a surface-modified zeolite from the ammonium-form zeolite and the hydrogen-form zeolite.

For a sodium-form dried and calcinated treated zeolite, further processing is needed to form a hydrogen-form surface-modified zeolite. The sodium of the dried and calcinated treated zeolite is ion exchanged with ammonium as previously described (step 110). The ammonium-form dried and calcinated treated zeolite from step 110 is then subjected to an additional drying step (step 120) and then an additional calcinating step (step 130) to form the hydrogen-form surface-modified zeolite. The additional drying and calcinating steps 120 and 130 are performed in the same manner as the drying and calcinating steps 90 and 100.

The dried and calcinated treated zeolite from step 100 may, however, be exposed to at least one additional selectivation sequence to further modify the surface thereof by depositing additional hybrid polymer thereon (step 105). The at least one additional selectivation sequence comprises the steps of forming a zeolite suspension comprising the dried and calcinated treated zeolite and additional solvent, and contacting additional hybrid polymer with the zeolite suspension under conditions sufficient to deposit additional hybrid polymer on external surfaces of the dried and calcinated treated zeolite.

The additional solvent is then removed. The additional hybrid polymer deposited on the external surfaces of the dried and calcinated treated zeolite is then dried and calcinated. The weight ratio of the dried and calcinated treated zeolite, the additional solvent, and the hybrid polymer used in each additional selectivation sequence may be substantially the same as that used in the initial selectivation sequence. The surface silica to alumina molar ratio increases with each selectivation sequence ("treatment"). If the dried and calcinated treated zeolite is a sodium-form zeolite, the exposing step 105 is performed prior to steps 110, 120, and 130, i.e., the exchanging, and the additional drying and calcinating steps (110, 120, and 130) are performed after the final selectivation sequence.

EXAMPLES

The following are examples of the preparation of surface-modified zeolites, in accordance with exemplary embodiments described herein. The examples are provided for illustration purposes only, and are not meant to limit the various embodiments of the present invention in any way.

Formation of Zeolite Extrudate

To form a zeolite extrudate from sodium-form MFI zeolite powder (available from UOP LLC (Des Plaines, Ill. (USA)), 60 grams (g) of binder was added to the Na-form MFI zeolite powder to form the extruded MFI zeolite. The binders included alumina, aluminophosphate (ALPO), and silica. The weight ratio of binder to Na-form MFI zeolite powder ranged from about 15 wt % to about 60 wt %.

Ion-Exchange of Sodium-Form MFI Zeolite Extrudate

The resultant zeolite extrudate was ion exchanged with ammonium nitrate ($NH_4NO_3$) three times and calcinated at 550° C. to form a hydrogen-form zeolite.

Formation of Zeolite Suspension 150 g of the dried extrudate and 400 g dry hexane were combined in a 1000 cc flask.

Synthesis of Hybrid Polymer Via Base-Catalyzed Reaction

A. Silicon-Titanium Bimetallic Hybrid Polymer 200 g tetraethylorthosilicate (0.96 mol) and 2 g tetrabutyl titanate (0.00588 mol) were added to 400 g ethanol solution. 7.5 g 25% $NH_4OH$ solution was added under vigorous stirring for 24 hours at room temperature to form a silicon-titanium bimetallic hybrid polymer.

B. Silicon-Zirconium Bimetallic Hybrid Polymer 200 g tetraethylorthosilicate and 2 g tetrapropyl zirconate were added to 400 g ethanol solution. 7.5 g 25% $NH_4OH$ solution was added under vigorous stirring for 24 hours at room temperature to form a silicon-zirconium bimetallic hybrid polymer.

Depositing Hybrid Polymer on Zeolite

The zeolite suspension was added to a 3 neck, 1 liter flask equipped with a stirrer, a reflux condenser, and a heating device. For each of the hybrid polymers, 63 g of the hybrid polymer was added to the flask. The extrudate/hexane/hybrid polymer mixture was heated for two hours. The hybrid polymer-treated solid extrudate was then filtered, dried overnight at 120° C., and then calcinated at 550° C. in flowing air for four hours using a heating rate of 2° C./min. After four hours at 550° C., the sample was cooled to produce a surface-modified MFI-type zeolite extrudate. The surface-modified MFI-type zeolite extrudate was exposed to multiple selectivation sequences using the same weight ratios of hybrid polymer/extrudate/hexane, e.g., 63 g Si and Ti-hybrid polymer solution/150 g extrudate/400 g hexane.

Surface-modified zeolites having metal oxide-enriched external surfaces and selectivation methods for preparing such surface-modified zeolites have been provided. The deposition of the hybrid polymers onto zeolite external surfaces from the above-described selectivation treatments substantially passivates the active sites on the external surface of the zeolite crystals, and narrows the zeolitic pores to facilitate the passage of smaller molecules and prevent bigger molecules from entering or exiting the pores. These modified surface properties facilitate selective catalysis applications and adsorptive processes, for example, para-alkyl selectivation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A surface-modified zeolite having metal oxide-enriched external surfaces, comprising:
    an ammonium-form zeolite, a hydrogen-form zeolite or a sodium-form zeolite having external surfaces;
    wherein the zeolite is selected from the group consisting of MFI, MEL, MTT, MWW, TON, TUN, EUO, IMF and FER zeolites;
    a coating on the external surfaces comprised of a metal oxide selected from the group consisting of, $SiO_2$ and $TiO_2$, $SiO_2$ and $ZrO_2$, and $SiO_2$, $TiO_2$, and $ZrO_2$; and
    wherein said surface-modified zeolite comprises zeolitic pores that are narrowed to facilitate passage of smaller molecules and prevention of passage of bigger molecules from entering or exiting the zeolitic pores.

* * * * *